(12) United States Patent
Okadome et al.

(10) Patent No.: US 8,561,494 B2
(45) Date of Patent: Oct. 22, 2013

(54) MANUAL TRANSMISSION

(75) Inventors: Yasuki Okadome, Hiroshima (JP); Wataru Kuwahara, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 670 days.

(21) Appl. No.: 12/711,001

(22) Filed: Feb. 23, 2010

(65) Prior Publication Data

US 2010/0242647 A1    Sep. 30, 2010

(30) Foreign Application Priority Data

Mar. 31, 2009  (JP) .................................. 2009-083947

(51) Int. Cl.
*F16H 3/08* (2006.01)

(52) U.S. Cl.
USPC .............................................. 74/331; 74/330

(58) Field of Classification Search
USPC ................... 74/325, 330, 331, 339, 359, 360
See application file for complete search history.

(56) References Cited

U.S. PATENT DOCUMENTS

| | | | | |
|---|---|---|---|---|
| 4,463,621 A | * | 8/1984 | Fisher | ............................... 74/330 |
| 4,693,129 A | * | 9/1987 | Pierce | ............................... 74/333 |
| 4,738,149 A | | 4/1988 | Janiszewski | |
| 6,990,871 B2 | * | 1/2006 | Ebenhoch | ........................... 74/74 |
| 7,080,567 B2 | * | 7/2006 | Hatakeyama | ................... 74/331 |
| 7,128,680 B2 | * | 10/2006 | Holmes | ........................... 475/204 |
| 7,155,994 B2 | * | 1/2007 | Gumpoltsberger | .............. 74/340 |
| 7,287,442 B2 | * | 10/2007 | Gumpoltsberger | .............. 74/331 |
| 7,448,290 B2 | * | 11/2008 | Gitt | ................................... 74/331 |
| 7,470,206 B2 | * | 12/2008 | Rodgers, II | .................... 475/218 |
| 7,896,770 B2 | * | 3/2011 | Earhart et al. | ................. 475/218 |
| 7,987,739 B2 | * | 8/2011 | Okadome et al. | ............... 74/331 |
| 8,037,784 B2 | * | 10/2011 | Raoul | ............................. 74/661 |
| 2001/0042416 A1 | | 11/2001 | Suzuki et al. | |
| 2004/0121870 A1 | * | 6/2004 | Takenaka et al. | .................. 475/5 |
| 2005/0103140 A1 | * | 5/2005 | Gumpoltsberger | .............. 74/329 |
| 2007/0107542 A1 | * | 5/2007 | Gumpoltsberger | .............. 74/331 |
| 2008/0141808 A1 | * | 6/2008 | Gumpoltsberger | .............. 74/340 |
| 2008/0245166 A1 | * | 10/2008 | Baldwin | ......................... 74/331 |
| 2008/0295627 A1 | * | 12/2008 | Okadome et al. | ............... 74/331 |

(Continued)

FOREIGN PATENT DOCUMENTS

| | | |
|---|---|---|
| GB | 2 159 898 A | 12/1985 |
| WO | 01/02749 A1 | 1/2001 |

(Continued)

OTHER PUBLICATIONS

Extended European Search Report dated Apr. 27, 2010; Application No. 10001774.8-2421.

*Primary Examiner* — Troy Chambers
*Assistant Examiner* — Alexander Vu
(74) *Attorney, Agent, or Firm* — Studebaker & Brackett PC

(57) ABSTRACT

A gear train for first gear, a gear train for another specified forward gear and a gear train for reverse gear are arranged in order from the opposite side to an engine. A synchronizer for reverse gear is arranged on a first countershaft between a first driven gear of the gear train for reverse gear and a driven gear of the gear train for first gear. The synchronizer for reverse gear connects the first driven gear of the gear train for reverse gear and the driven gear of the gear train for first gear when a reverse shift is selected. Accordingly, the manual transmission which can shorten its axial size can be provided.

8 Claims, 3 Drawing Sheets

(56) References Cited

U.S. PATENT DOCUMENTS

2009/0137358 A1* 5/2009 Braford .................. 475/271
2010/0242647 A1* 9/2010 Okadome et al. ............ 74/331
2010/0255949 A1* 10/2010 Mellet et al. ............ 475/271

FOREIGN PATENT DOCUMENTS

| WO | 2007/020431 A1 | | 2/2007 |
| WO | WO2007085765 | * | 7/2007 |
| WO | WO 2007085765 A1 | * | 8/2007 |

* cited by examiner

Vehicle Front Side ←

MANUAL TRANSMISSION

BACKGROUND OF THE INVENTION

The present invention relates to a manual transmission.

A manual transmission, for example, comprises an input shaft receiving a drive force from an engine, countershafts arranged in parallel to the input shaft, plural gear trains arranged between the input shaft and the countershafts, and differential drive gears fixed to the countershafts to drive a differential ring gear on a driveshaft.

A multi-stage transmission has been demanded for the improvement of drive feelings and the like. This multi-stage transmission, however, may increase the number of gears and synchronizers which are arranged on the input shaft and the countershafts, so that the length of these shafts may be so long that the axial size of the transmission would become improperly large.

The transmission which is disclosed in WO01/02749A1, for example, may solve the above-described problem. That is, according to the transmission disclosed in the above-described publication, two countershafts are provided and differential drive gears to drive the differential ring gear on the driveshaft are provided on these countershafts, respectively. Thereby, the synchronizer can be provided at the input shaft and the two countershafts separately, so that the length of the shafts, consequently, the axial size of the transmission may be shortened.

However, further reduction of the axial size of the transmission is demanded even in case of this transmission equipped with the input shaft and the two countershafts.

SUMMARY OF THE INVENTION

Accordingly, an object of the present invention is to provide a manual transmission equipped with the input shaft and the two countershafts which can further shorten the axial size of the transmission.

According to the present invention, there is provided a manual transmission, comprising an input shaft receiving a drive force from an engine, first and second countershafts arranged in parallel to the input shaft, respectively, plural gear trains arranged between the input shaft and the first and second countershafts, the plural gear trains comprising a gear train for first gear, a gear train for another specified forward gear and a gear train for reverse gear which are arranged in order in an axial direction, and first and second differential drive gears fixed to the first and second countershafts to drive a differential ring gear on a driveshaft, respectively, wherein the gear train for first gear comprises a drive gear which is fixed on the input shaft and a driven gear which is provided rotatably on the first countershaft so as to engage with the drive gear, the gear train for another specified forward gear comprises a drive gear which is fixed on the input shaft and a driven gear which is provided rotatably on the second countershaft so as to engage with the drive gear, the gear train for reverse gear comprises a first driven gear which is provided rotatably on the first countershaft and a second driven gear which is fixed to the second countershaft so as to engage with the first driven gear, wherein a synchronizer for reverse gear is arranged on the first countershaft between the first driven gear of the gear train for reverse gear and the driven gear of the gear train for first gear, the synchronizer for reverse gear connecting the first driven gear of the gear train for reverse gear and the driven gear of the gear train for first gear when a reverse shift is selected.

According to the present invention, since no gear of the specified forward gear is provided on the first countershaft between the first driven gear of the gear train for reverse gear and the driven gear of the gear train for first gear, some space exits there. Thus, the synchronizer for reverse gear can be properly arranged in this space. Thereby, the axial length of the first countershaft can be shortened. Further, since the synchronizer for reverse gear is configured to connect the first driven gear of the gear train for reverse gear and the driven gear of the gear train for first gear, the drive gear of the gear train for first gear can be used as the drive gear for reverse gear. Accordingly, the structure of the transmission can be simplified.

According to an embodiment of the present invention, a recess portion is formed at an inner peripheral portion of the driven gear of the gear train for first gear on the side of first driven gear of the gear train for reverse gear, and a sleeve of the synchronizer for reverse gear is provided in the recess portion. Thereby, the sleeve of the synchronizer for reverse gear overlaps with the driven gear of the gear train for first gear in the axial direction, so that the axial size necessary for arranging the synchronizer for reverse gear can be shortened. Accordingly, the length of the first countershaft can be further shortened.

Meanwhile, the driveshaft extends in the vehicle width direction at a lower position, so a front side frame (a vehicle-body structure member) which extends in the vehicle longitudinal direction is arranged at a level which is higher than the driveshaft. That is, it is preferable that the mounting width of an upper portion of the transmission be narrower.

Herein, according to another embodiment of the present invention, the first countershaft is arranged above the input shaft. Thereby, the proper mounting of the transmission can be achieved.

According to another embodiment of the present invention, a thrust receiving member to receive a thrust force acting from the driven gear of the gear train for first gear toward the first driven gear of the gear train for reverse gear is provided between the driven gear of the gear train for first gear and the first driven gear of the gear train for reverse gear, and a step portion to receive the thrust force acting on the thrust receiving member from the driven gear of the gear train for first gear is provided at the first countershaft. Thereby, it can be prevented that the thrust force which occurs at the driven gear of the gear train for first gear transmits to the first driven gear of the gear train for reverse gear. Further, it can be also prevented that the thrust force from the driven gear of the gear train for first gear acts on a journal of the first driven gear of the gear train for reverse gear Other features, aspects, and advantages of the present invention will become apparent from the following description which refers to the accompanying drawings.

DETAILED DESCRIPTION OF THE INVENTION

Hereinafter, a preferred embodiment of the present invention will be described referring to the accompanying drawings.

Figure 1:
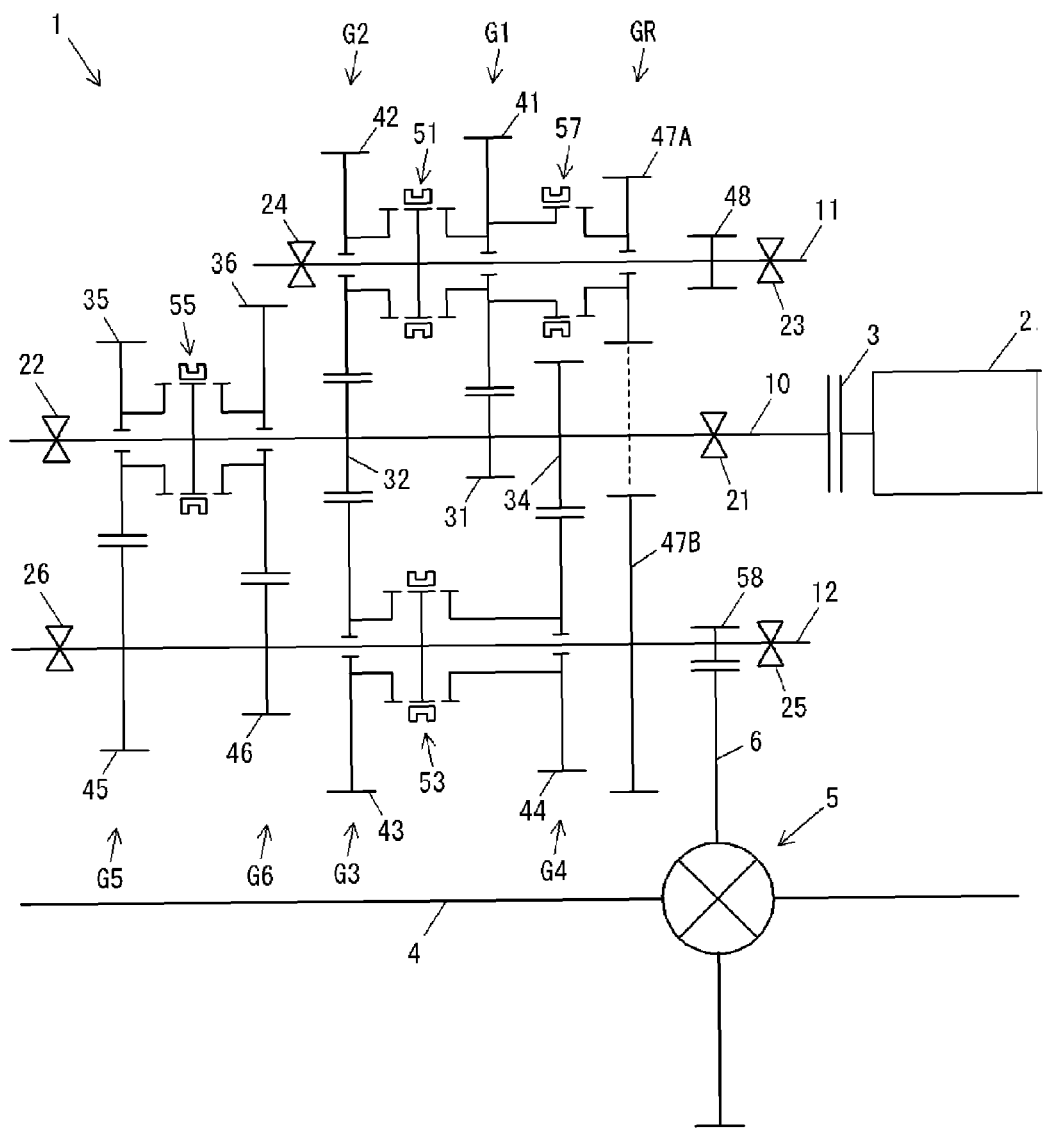
FIG. 1 is a skeleton of a manual transmission according to an embodiment of the present invention.

FIG. 1 is a skeleton of a manual transmission according to an embodiment of the present invention. A transmission 1 of the present embodiment is a so-called lateral-disposition type of manual transmission which comprises plural shafts, and achieves shifts for the six-forward gears and the reverse gear. Hereinafter, an engine side of the transmission 1 will be referred to as a "transmission-front side" and the anti-engine side of the transmission 1 will be referred to as a "transmission-rear side."

The transmission 1 comprises an input shaft 10 which receives a rotational drive force from an engine 2 via a clutch device 3, first and second countershafts 11, 12 which are arranged in parallel to the input shaft 10, plural gear trains G1, G2, G3, G4, G5, G6, GR which are arranged between the input shaft 10 and the first and second countershafts 11, 12, and first and second differential drive gears 48, 58 which are provided on the first and second countershafts 11, 12, respectively, on the transmission-front side of the gear trains so as to drive a differential ring gear 6 of a differential device 5 on the drive shaft 4, respectively.

The input shaft 10, the first countershaft 11 and the second countershaft 12 are rotatably supported at bearings 21-26 at two points, a front end on the transmission-front side and a rear end on the transmission-rear side.

The above-described plural gear trains are arranged in such a manner that the gear train for reverse gear GR, the gear train for fourth gear G4, the gear train for first gear G1, the gear train for second gear G2 and the gear train for third gear G3, the gear train for sixth gear G6, and the gear train for fifth gear G5 are arranged in order from the transmission-front side.

The gear train for first gear G1 comprises a drive gear for first gear 31 which is fixed to the input shaft 10 and a driven gear for first gear 41 which is rotatably provided on the first countershaft 11 so as to engage with the drive gear 31.

The gear train for second gear G2 comprises a drive gear for first-second gear 32 which is fixed to the input shaft 10 and a driven gear for second gear 42 which is rotatably provided on the first countershaft 11 so as to engage with the drive gear 32.

The gear train for third gear G3 comprises a drive gear for first-second gear 32 which is fixed to the input shaft 10 and a driven gear for third gear 43 which is rotatably provided on the second countershaft 12 so as to engage with the drive gear 32.

The gear train for fourth gear G4 comprises a drive gear for fourth gear 34 which is rotatably provided on the input shaft 10 and a driven gear for fourth gear 44 which is fixed to the second countershaft 12 so as to engage with the drive gear 34.

The gear train for fifth gear G5 comprises a drive gear for fifth gear 35 which is rotatably provided on the input shaft 10 and a driven gear for fifth gear 45 which is fixed to second countershaft 12 so as to engage with the drive gear 35.

The gear train for sixth gear G6 comprises a drive gear for sixth gear 36 which is rotatably provided on the input shaft 10 and a driven gear for sixth gear 46 which is fixed to second countershaft 12 so as to engage with the drive gear 36.

The gear train for reverse gear GR comprises a first driven gear for reverse gear 47A which is rotatably provided on the first countershaft 11 and a second driven gear for reverse gear 47B which is fixed to second countershaft 12 so as to engage with the first driven gear 47A.

Further, a fifth-sixth synchronizer 55 is arranged on the input shaft 10 between the drive gear for fifth gear 35 and the drive gear for sixth gear 36. This fifth-sixth synchronizer 55 connects the drive gear for fifth or sixth gear to the input shaft 10 when a shift for fifth or sixth gear is selected. A synchronizer for reverse gear 57 is arranged on the first countershaft 11 between the first driven gear for reverse gear 47A and the driven gear for first gear 41. This synchronizer for reverse gear 57 connects the first driven gear for reverse gear 47A to the driven gear for first gear 41 when a reverse shift is selected. A first-second synchronizer 51 is arranged on the first countershaft 11 between the driven gear for first gear 41 and the driven gear for second gear 42. This first-second synchronizer 51 connects the driven gear for first or second gear to the first countershaft 11 when a shift for first or second gear is selected. A third-fourth synchronizer 53 is arranged on the second countershaft 12 between the driven gear for third gear 43 and the driven gear for fourth gear 44. This third-fourth synchronizer 53 connects the driven gear for third or fourth gear to the second countershaft 12 when a shift for third or fourth gear is selected.

Hereinafter, the transmission of power according to the above-described transmission 1 will be described.

When the neutral is selected, since any synchronizer does not operate, none of the gears of the gear trains which are rotatably provided are connected to the shafts 10, 11, 12. Accordingly, the rotational drive force is not transmitted to the differential ring gear 6 of the drive shaft 4 even if the input shaft 10 rotates, so that the drive shaft 4 does not rotate.

When the shift for first gear is selected, the driven gear for first gear 41 is connected to the first countershaft 11 via the first-second synchronizer 51. Accordingly, as the input shaft 10 rotates, the rotational drive force is transmitted with the flow of the drive gear for first gear 31→the driven gear for first gear 41→the first countershaft 11→the first differential drive gear 48→the differential ring gear 6. Thereby, the rotational drive force of the engine 2 is outputted to the drive shaft 4 with the greatest reduction of speed.

When the shift for second gear is selected, the driven gear for second gear 42 is connected to the first countershaft 11 via the first-second synchronizer 51. Accordingly, as the input shaft 10 rotates, the rotational drive force is transmitted with the flow of the drive gear for second-third gear 32→the driven gear for second gear 42→the first countershaft 11→the first differential drive gear 48→the differential ring gear 6. Thereby, the rotational drive force of the engine 2 is outputted to the drive shaft 4 with the reduction of speed.

When the shift for third gear is selected, the driven gear for third gear 43 is connected to the second countershaft 12 via the third-fourth synchronizer 53. Accordingly, as the input shaft 10 rotates, the rotational drive force is transmitted with the flow of the drive gear for second-third gear 32→the driven gear for third gear 43→the second countershaft 12→the second differential drive gear 58→the differential ring gear 6. Thereby, the rotational drive force of the engine 2 is outputted to the drive shaft 4 with the small reduction of speed.

When the shift for fourth gear is selected, the driven gear for fourth gear 44 is connected to the second countershaft 12 via the third-fourth synchronizer 53. Accordingly, as the input shaft 10 rotates, the rotational drive force is transmitted with the flow of the drive gear for fourth gear 34→the driven gear for fourth gear 44→the second countershaft 12→the second differential drive gear 58→the differential ring gear 6. Thereby, the rotational drive force of the engine 2 is outputted to the drive shaft 4 with substantially the same speed.

When the shift for fifth gear is selected, the drive gear for fifth gear 35 is connected to the input shaft 10 via the fifth-sixth synchronizer 55. Accordingly, as the input shaft 10 rotates, the rotational drive force is transmitted with the flow of the drive gear for fifth gear 35→the driven gear for fifth gear 45→the second countershaft 12→the second differential drive gear 58→the differential ring gear 6. Thereby, the rotational drive force of the engine 2 is outputted to the drive shaft 4 with the small increase of speed.

When the shift for sixth gear is selected, the drive gear for sixth gear 36 is connected to the input shaft 10 via the fifth-sixth synchronizer 55. Accordingly, as the input shaft 10 rotates, the rotational drive force is transmitted with the flow of the drive gear for sixth gear 36→the driven gear for sixth gear 46→the second countershaft 12→the second differential drive gear 58→the differential ring gear 6. Thereby, the rotational drive force of the engine 2 is outputted to the drive shaft 4 with the greatest increase of speed.

Meanwhile, when the shift for reverse gear is selected, the driven gear for reverse gear 47A is connected to the driven gear for first gear 41 via the synchronizer for reverse gear 57. Accordingly, as the input shaft 10 rotates, the rotational drive force is transmitted with the flow of the drive gear for first gear 31→the driven gear for first gear 41→the synchronizer for reverse gear 57→the first driven gear for reverse gear 47A→the second driven gear for reverse gear 47B→the second differential drive gear 58→the differential ring gear 6. Thereby, the rotational drive force of the engine 2 is outputted to the drive shaft 4 with the reverse rotational direction.

Figure 2:
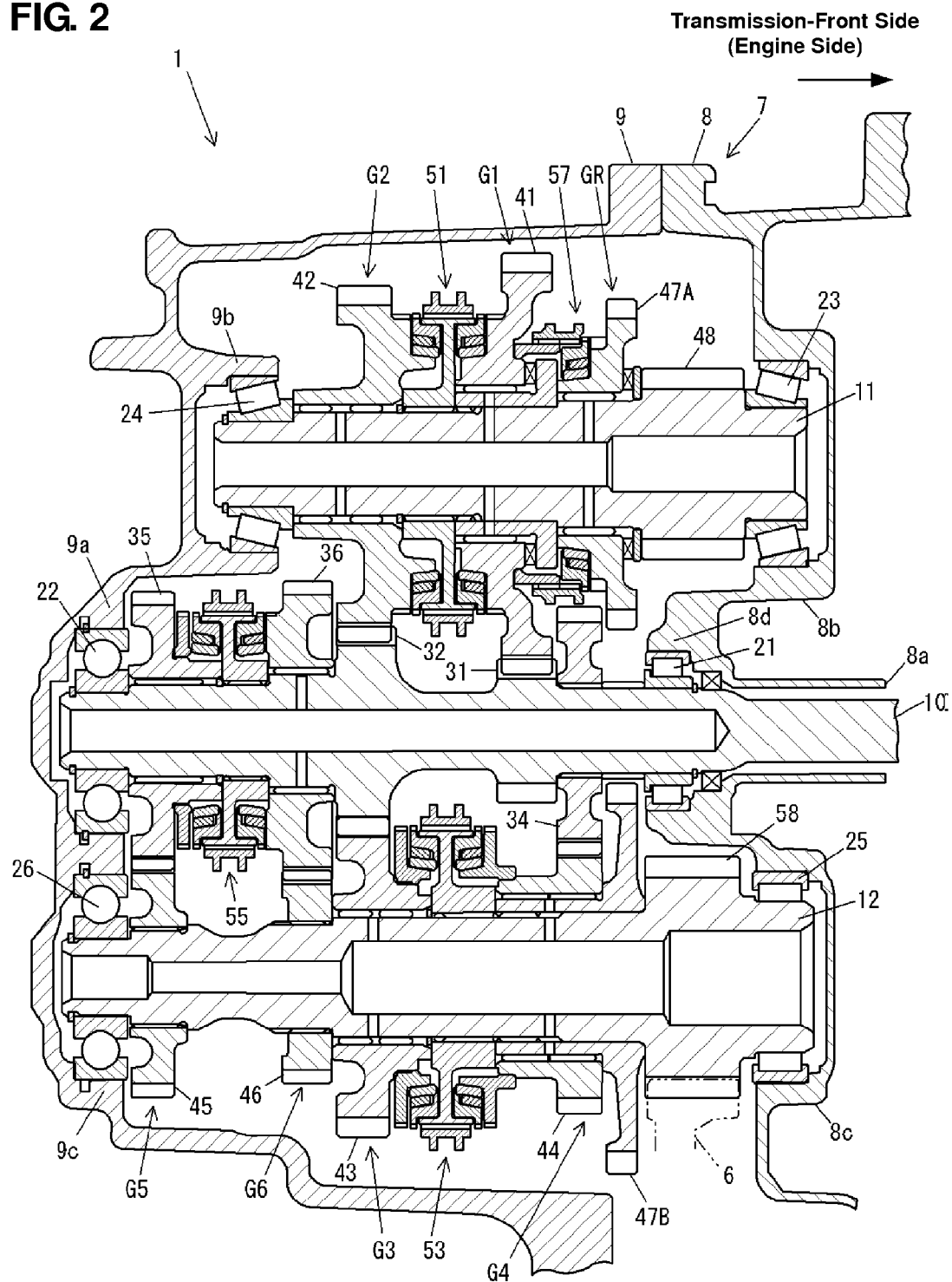
FIG. 2 is an enlarged sectional view of the manual transmission.

FIG. 2 is an enlarged sectional view of the transmission 1 of the present embodiment. Hereinafter, the specific structure of this transmission 1 will be described referring to this figure.

The transmission 1 comprises a transmission case 7 which stores the above-described input shaft 10, first countershaft 11, second countershaft 12, gear trains G1, G2, G3, G4, G5, G6, GR, synchronizers 51, 53, 55, 57, clutch device 3 (not illustrated in FIG. 2), differential device 5 (not illustrated in FIG. 2), and so on.

The transmission case 7 comprises a clutch housing 8 which is arranged on the transmission-front side and a mission case 9 which is arranged on the transmission-rear side. The clutch housing 8 includes a through hole 8*a* through which the input shaft 10 extends in the axial direction, and has front-end support portions 8*b*, 8*c* which support front end portions of the first and second countershafts 11, 12 and a middle support portion 8*d* which supports a middle portion of the input shaft 10. The mission case 9, which is a cylindrical case with a bottom, has rear-end support portions 9*a*, 9*b*, 9*c* which support rear end portions of the shafts 10, 11, 12. The input shaft 10, first countershaft 11, and second countershaft 12 are rotatably supported at the support portions 8*b*, 8*c*, 8*d*, 9*a*, 9*b*, 9*c* via the bearings 21-26.

The gears 31, 32, 34, 45, 46, 47B among the gears constituting the gear trains G1, G2, G3, G4, G5, G6, GR are fixed to the shafts 10, 11, 12 respectively by means of a spline connection or integration with the shafts. Meanwhile, the gears 41, 42, 43, 44, 35, 36, 47A are rotatably supported on the shafts 10, 11, 12 via needle bearings or other means.

The first and second differential drive gears 48, 58 are formed integrally with the first and second countershafts 11, 12, respectively.

Each of the synchronizers 51, 53, 55, 57 is a so-called triple or double cone type of synchronizer. While its specific description is omitted here, it comprises a clutch hub which is coupled to each of the shafts 10, 11, 12 via a spline connection, a sleeve which is provided on the hub so as to slide in the axial direction, three cones for each shift gear and the like which are arranged between the right and left gears. Herein, when the sleeve slides in the axial direction, the spline of the inner face of the sleeve moves so as to engage with the spline of the hub, the spline of the outer cone, and an engaging tooth formed at the gear, having a pressing contact of the cone face. Thereby, the gears on the slide side are coupled to the respective shafts.

Figure 3:
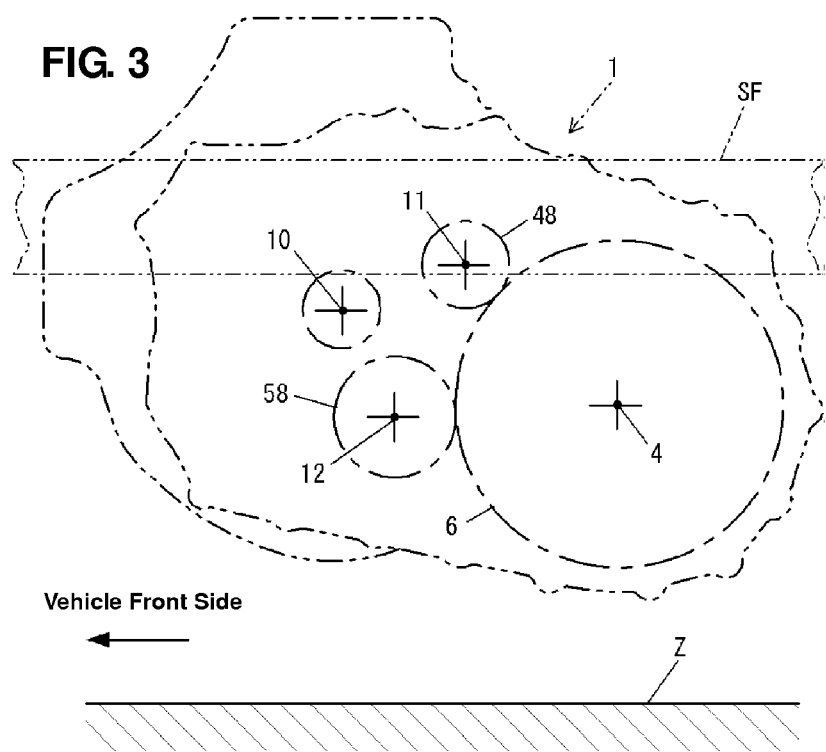
FIG. 3 is a schematic side view showing positional relationships of shafts of the manual transmission in a mount state.

FIG. 3 is a schematic side view showing positional relationships of the respective shafts of the manual transmission 1 in a mount state according to the present embodiment. As shown in FIG. 3, the input shaft 10 is arranged at a front position in the vehicle longitudinal direction and at the middle level in the vertical direction. The first countershaft 11 is arranged behind and slightly above the input shaft 10. The second countershaft 12 is arranged behind and slightly below the input shaft 10. The drive shaft 4 equipped with the differential ring gear 6 with which the differential gears 48, 58 of the first and second countershafts 11, 12 engage is arranged at a rear position. In this figure a reference character Z denotes a road face.

Herein, as shown in FIG. 3, it may be necessary that the front side frame SF (vehicle-body constituting member) which extends in the vehicle longitudinal direction is arranged at a higher position than the drive shaft 4 because the drive shaft 4 extends in the vehicle width direction at a lower position. That is, it is preferable that the mounting width of the upper portion of the transmission 1 be narrower. According to the present embodiment, the first countershaft 11 which has the fewest gears is arranged at a level which is higher than the input shaft 10, the second countershaft 12, and the drive shaft 4.

Figure 4:
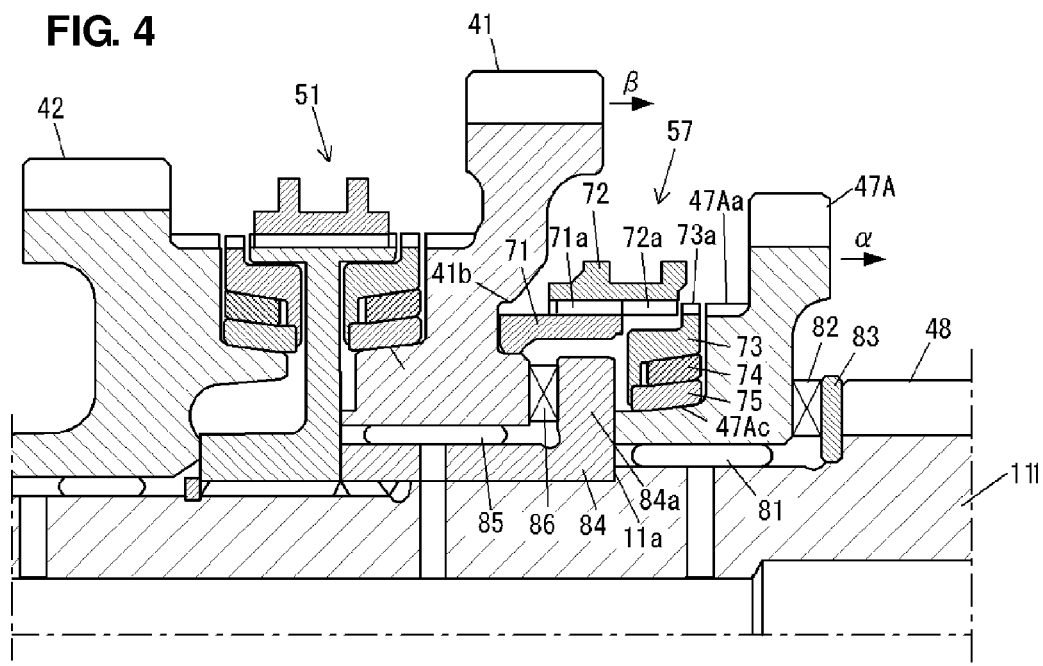
FIG. 4 is an enlarged view of a synchronizer for reverse gear of FIG. 2 and its peripheral portion.

That is, according to the present embodiment, as shown in FIGS. 1 and 2, the synchronizer for reverse gear 57 is arranged on the first countershaft 11 between the first driven gear for reverse gear 47A and the driven gear for first gear 41. In other words, the synchronizer for reverse gear 57 is arranged by using a space on the first countershaft 11 which is positioned at around the same position as the gear train fir fourth gear G4 in the axial direction, where the gear for fourth gear does not exist. Specifically speaking, as shown in FIG. 4, a recess portion 41*b* is formed at an inner peripheral portion of the driven gear for first gear 41 on the side of first driven gear for reverse gear 47A, and the synchronizer for reverse gear 57 is arranged by using a space which is formed by the recess portion 41*b*.

The synchronizer for reverse gear 57 is the triple cone type of synchronizer as described above, and its clutch hub 71 is fixed to the recess portion 41*b* of the driven gear for first gear 41 at its end and extends in the axial direction toward the first driven gear for reverse gear 47A. Its sleeve 72 is configured to slide on the clutch hub 71 in the axial direction. Further, an outer cone 73, a middle cone 74, an inner cone 75 and so on are arranged between the clutch hub 71 and the first driven gear for reverse gear 47A. The outer cone 73 and the inner cone 75 are coupled to the clutch hub 71 so as to rotate together. The middle cone 74 is coupled to the first driven gear for reverse gear 47A so as to rotate together. Herein, when the sleeve 72 slides toward the first driven gear for reverse gear 47A, the cone face of the lower face of the outer cone 73 comes to contact the cone face of the upper face of the middle cone 74 with pressure, the cone face of the lower face of the middle cone 74 comes to contact the cone face of the upper face of the inner cone 75 with pressure, and the cone face of the lower face of the inner cone 75 comes to contact the cone face 47Ac of the first driven cone for reverse gear 47A with pressure. At the same time, a spline 72*a* of the inner face of the sleeve 72 comes to engage with a spline 71*a* of the hub 71, a spline 73*a* of the outer cone for first gear 73, and an engaging tooth 47Aa of the first driven gear for reverse gear 47A. Thereby, the first driven gear for reverse gear 47A is connected to the driven gear for first gear 41 via the synchronizer for reverse gear 51.

Herein, according to the present embodiment, the first driven gear for reverse gear 47A is comprised of a helical gear, so a thrust force acts on this gear 47A at the power transmission. In this case, this thrust force acts toward the first differential drive gear 48 as shown by an arrow α because of the inclination direction of the tooth of the helical gear.

Therefore, the first driven gear for reverse gear 47A is rotatably supported on the input shaft 10 via a needle bearing 81, and its face on the side of the first differential drive gear 48 is supported at a support member 83 which is positioned at the end face of the first differential drive gear 48 via a thrust bearing 82.

Further, according to the present embodiment, the driven gear for first gear 41 is comprised of a helical gear as well, so the thrust force acts on this gear 41 at the power transmission. In this case, this thrust force acts toward the first driven gear for reverse gear 47A as shown by an arrow β because of the inclination direction of the tooth of the helical gear.

Therefore, a support member 84 which has a rising portion 84a on the side of the first driven gear for reverse gear 47A so as to have an L-shaped cross section is coupled to a specified axial portion of the first countershaft 11 where the driven gear for first gear 41 is arranged via spline connection. The driven gear for first gear 41 is supported at this support member 84 via a roller bearing 85 and a thrust bearing 86.

Herein, in this case where the first driven gear for reverse gear 47A is supported as described above, in case the first driven gear for reverse gear 47A is connected to the driven gear for first gear 41 via the synchronizer for reverse gear 51 as described above, the thrust force acts toward the first driven gear for reverse gear 47A from the driven gear for first gear 41 as well. Herein, it may not be appropriate from the durability viewpoints of the bearing 82 that this thrust force acts on the thrust bearing 82 for the first driven gear for reverse gear 47A.

Thus, according to the present embodiment, a structure which can prevent the thrust force toward first driven gear for reverse gear 47A which acts on the driven gear for first gear 41 from acting on the thrust bearing 82 of the first driven gear for reverse gear 47A is applied.

That is, a step portion 11a is formed at a specified position of the first countershaft 11 which corresponds to the one end of the support member 84 on the side of the first driven gear for reverse gear 47A. This step portion 11a is configured to have a lager diameter of the shaft 11 on the side of first driven gear for reverse gear 47A. An inner peripheral portion of the end portion of the support member 84 on the side of the first driven gear for reverse gear 47A contacts the above-described step portion 11a.

According to this structure, the thrust force acting on the support member 84 from the side of the driven gear 41 of the gear train for first gear G1 is received by the step portion 11a, so that it can be prevented that the thrust force which occurs at the driven gear 41 of the gear train for first gear G1 transmits to the first driven gear 47A of the gear train for reverse gear GR. Further, it can be also prevented that the thrust force from the driven gear 41 of the gear train for first gear G1 acts on the thrust bearing 86 of the first driven gear 47A of the gear train for reverse gear GR.

Hereinafter, the operation and advantages of the manual transmission 1 according to the present embodiment will be described.

According to the present embodiment, the gear train for first gear G1, the gear train for fourth gear G4 (gear train for another specified forward gear than the first gear) and the gear train for reverse gear GR are arranged in order from the opposite side to the engine 2. The gear train for first gear G1 comprises the drive gear 31 which is fixed to the input shaft 10 and the driven gear 41 which is rotatably provided on the first countershaft 11 so as to engage with the drive gear 31. The gear train for fourth gear G4 comprises the drive gear 34 which is rotatably provided on the input shaft 10 and the driven gear 44 which is fixed to the second countershaft 12 so as to engage with the drive gear 34. The gear train for reverse gear GR comprises the first driven gear 47A which is rotatably provided on the first countershaft 11 and the second driven gear 47B which is fixed to second countershaft 12 so as to engage with the first driven gear 47A. Thus, since no gear of the gear train for fourth gear G4 is provided on the first countershaft 11 between the first driven gear 47A and the driven gear 41 of the gear train for first gear G1, some space exits there. Thus, according to the present embodiment, the synchronizer for reverse gear 57 can be properly arranged in this space between the first driven gear 47A and the driven gear 41 of the gear train for first gear G1. Thereby, the axial length of the first countershaft 11 can be shortened. Further, since the synchronizer for reverse gear 57 is configured to connect the first driven gear 47A of the gear train for reverse gear GR and the driven gear 41 of the gear train for first gear G1, the drive gear 31 of the gear train for first gear G1 can be used as the drive gear for reverse gear. Accordingly, the structure of the transmission 1 can be simplified.

Further, the recess portion 41b is formed at the inner peripheral portion of the driven gear 41 of the gear train for first gear G1 on the side of first driven gear 47A of the gear train for reverse gear GR, and the sleeve 72 of the synchronizer for reverse gear 57 is provided in the recess portion 41b. Thereby, the sleeve 72 of the synchronizer for reverse gear 57 overlaps with the driven gear 41 of the gear train for first gear G1 in the axial direction, so that the axial size necessary for arranging the synchronizer for reverse gear 57 can be shortened. Accordingly, the length of the first countershaft 1 can be further shortened.

Moreover, since the shorter first countershaft 11 is arranged above the input shaft 10 and the second countershaft 12, the proper mounting of the transmission 1 can be achieved.

Also, since the step portion 11a which receives the thrust force acting on the support member 84 from the driven gear 41 of the gear train for first gear G1 is provided at the first countershaft 11, it can be prevented that the thrust force which occurs at the driven gear 42 of the gear train for first gear G1 transmits to the first driven gear 47A of the gear train for reverse gear GR.

The present invention should not be limited to the above-descried embodiment, and any other modifications and improvements may be applied within the scope of a sprit of the present invention.

For example, while the gear train for first gear, the gear train for another specified forward gear and the gear train for reverse gear are arranged in order from the anti-engine side in the above-described embodiment, the present invention is applicable to a case in which the above-described gear trains are arranged in order from the engine side as well. Further, the above-described specified forward gear is the fourth gear in the above-described embodiment, the present invention is also applicable to any case of the second, third, fifth or sixth gear.

What is claimed is:

1. A manual transmission, comprising:
an input shaft receiving a drive force from an engine;
first and second countershafts arranged in parallel to said input shaft, respectively;
plural gear trains arranged between said input shaft and said first and second countershafts, the plural gear trains including at least a gear train for first gear and a gear train for reverse gear which are arranged in order in an axial direction; and first and second differential drive gears fixed to said first and second countershafts to drive a differential ring gear on a driveshaft, respectively, wherein said gear train for first gear comprises a drive gear which is fixed on said input shaft and a driven gear which is provided rotatably on said first countershaft so as to engage with the drive gear, said gear train for reverse gear comprises a first driven gear which is provided rotatably on said first countershaft and a second driven gear which is fixed to said second countershaft so as to engage with the first driven gear, wherein a synchronizer for reverse gear is arranged on said first countershaft between the first driven gear of the gear train for reverse gear and the driven gear of the gear train for first gear, the synchronizer for reverse gear connecting the first driven gear of the gear train for reverse gear and the driven gear of the gear train for first gear when a reverse shift is selected such that the drive force from the engine is transmitted in order via the input shaft, the drive gear and the driven gear of the gear train for first gear, the synchronizer for reverse gear, the first driven gear and the second driven gear of the gear train for reverse gear, the second differential drive gear fixed to the second countershaft, and the differential ring gear on the driveshaft, thereby achieving a reverse-gear shift of the transmission.

2. The manual transmission of claim 1, wherein a recess portion is formed at an inner peripheral portion of the driven gear of said gear train for first gear on the side of first driven gear of said gear train for reverse gear, and a sleeve of said synchronizer for reverse gear is provided in the recess portion.

3. The manual transmission of claim 2, wherein said first countershaft is arranged above said input shaft.

4. The manual transmission of claim 3, wherein a thrust receiving member to receive a thrust force acting from the driven gear of the gear train for first gear toward the first driven gear of said gear train for reverse gear is provided between the driven gear of the gear train for first gear and the first driven gear of the gear train for reverse gear, and a step portion to receive the thrust force acting on said thrust receiving member from the driven gear of the gear train for first gear is provided at the first countershaft.

5. A manual transmission, comprising:
an input shaft receiving a drive force from an engine;
first and second countershafts arranged in parallel to said input shaft, respectively;
plural gear trains arranged between said input shaft and said first and second countershafts, the plural gear trains including at least a gear train for first gear and a gear train for reverse gear which are arranged in order from an anti-engine side; and first and second differential drive gears fixed to said first and second countershafts to drive a differential ring gear on a driveshaft, respectively, wherein said gear train for first gear comprises a drive gear which is fixed on said input shaft and a driven gear which is provided rotatably on said first countershaft so as to engage with the drive gear, said gear train for reverse gear comprises a first driven gear which is provided rotatably on said first countershaft and a second driven gear which is fixed to said second countershaft so as to engage with the first driven gear, wherein a synchronizer for reverse gear is arranged on said first countershaft between the first driven gear of the gear train for reverse gear and the driven gear of the gear train for first gear, the synchronizer for reverse gear connecting the first driven gear of the gear train for reverse gear and the driven gear of the gear train for first gear when a reverse shift is selected such that the drive force from the engine is transmitted via the input shaft, the drive gear and the driven gear of the gear train for first gear, the synchronizer for reverse gear, the first driven gear and the second driven gear of the gear train for reverse gear, the second differential drive gear fixed to the second countershaft, and the differential ring gear on the driveshaft, thereby achieving a reverse-gear shift of the transmission.

6. The manual transmission of claim 5, wherein said first driven gear of the gear train for reverse gear is arranged beside said first differential drive gear.

7. The manual transmission of claim 6, wherein a recess portion is formed at an inner peripheral portion of the driven gear of said gear train for first gear on the side of first driven gear of said gear train for reverse gear, and a sleeve of said synchronizer for reverse gear is provided in the recess portion.

8. The manual transmission of claim 7, wherein a thrust receiving member to receive a thrust force acting from the driven gear of the gear train for first gear toward the first driven gear of said gear train for reverse gear is provided between the driven gear of the gear train for first gear and the first driven gear of the gear train for reverse gear, and a step portion to receive the thrust force acting on said thrust receiving member from the driven gear of the gear train for first gear is provided at the first countershaft.

* * * * *